(12) United States Patent
Koulchar et al.

(10) Patent No.: US 6,224,143 B1
(45) Date of Patent: May 1, 2001

(54) COWL PANEL WITH WATER RESISTANT HVAC AIR INLETS

(75) Inventors: Anthony Scott Koulchar, Burt; Bruce A. Dziadzio, Brighton, both of MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/496,608

(22) Filed: Feb. 2, 2000

(51) Int. Cl.⁷ ....................................................... B60J 7/00
(52) U.S. Cl. ............................................................ 296/192
(58) Field of Search ................................. 296/192, 208; 454/337, 275; 55/97; 51/295

(56) References Cited

U.S. PATENT DOCUMENTS

| | | | |
|---|---|---|---|
| 3,845,983 | * 11/1974 | Heintz | 296/192 |
| 4,466,654 | * 8/1984 | Abe | 296/192 |
| 4,679,845 | * 7/1987 | Detampel et al. | 296/192 |
| 4,718,712 | * 1/1988 | Nakatani | 296/192 |
| 4,765,672 | * 8/1988 | Weaver | 296/192 |
| 4,893,865 | * 1/1990 | McClain et al. | 296/192 |
| 4,909,566 | * 3/1990 | Hashimoto et al. | 296/192 |
| 5,090,975 | * 2/1992 | Requejo et al. | 55/97 |
| 5,108,146 | * 4/1992 | Sheppard | 296/192 |
| 5,230,547 | * 7/1993 | Koukal et al. | 296/192 |
| 5,383,815 | * 1/1995 | Kiesel et al. | 296/208 |
| 5,692,953 | * 12/1997 | Bell et al. | 296/192 |
| 6,066,188 | * 5/2000 | Benedict et al. | 51/295 |

FOREIGN PATENT DOCUMENTS

| | | | |
|---|---|---|---|
| 3736780 | * 12/1988 | (DE) | 296/192 |
| 3923687 | * 1/1991 | (DE) | 296/192 |
| 002249528 | * 5/1992 | (GB) | 296/192 |
| 0178883 | * 8/1981 | (JP) | 296/192 |
| 0096066 | * 6/1984 | (JP) | 296/192 |
| 0157871 | * 7/1987 | (JP) | 296/192 |

* cited by examiner

Primary Examiner—Joseph D. Pape
Assistant Examiner—Kiran B. Patel
(74) Attorney, Agent, or Firm—Charles E. Leahy

(57) ABSTRACT

A cowl panel for an automotive vehicle has a plurality of air vents which direct outside air into an air plenum for distribution to the interior of the vehicle through the heating, air conditioning and ventilation system. An air permeable mat is bonded to the underside of the cowl to cover the air vents. The mat permits the passage of air but restricts the passage of liquids such as water thereby reducing the volume of water that must be drained from the plenum.

3 Claims, 1 Drawing Sheet

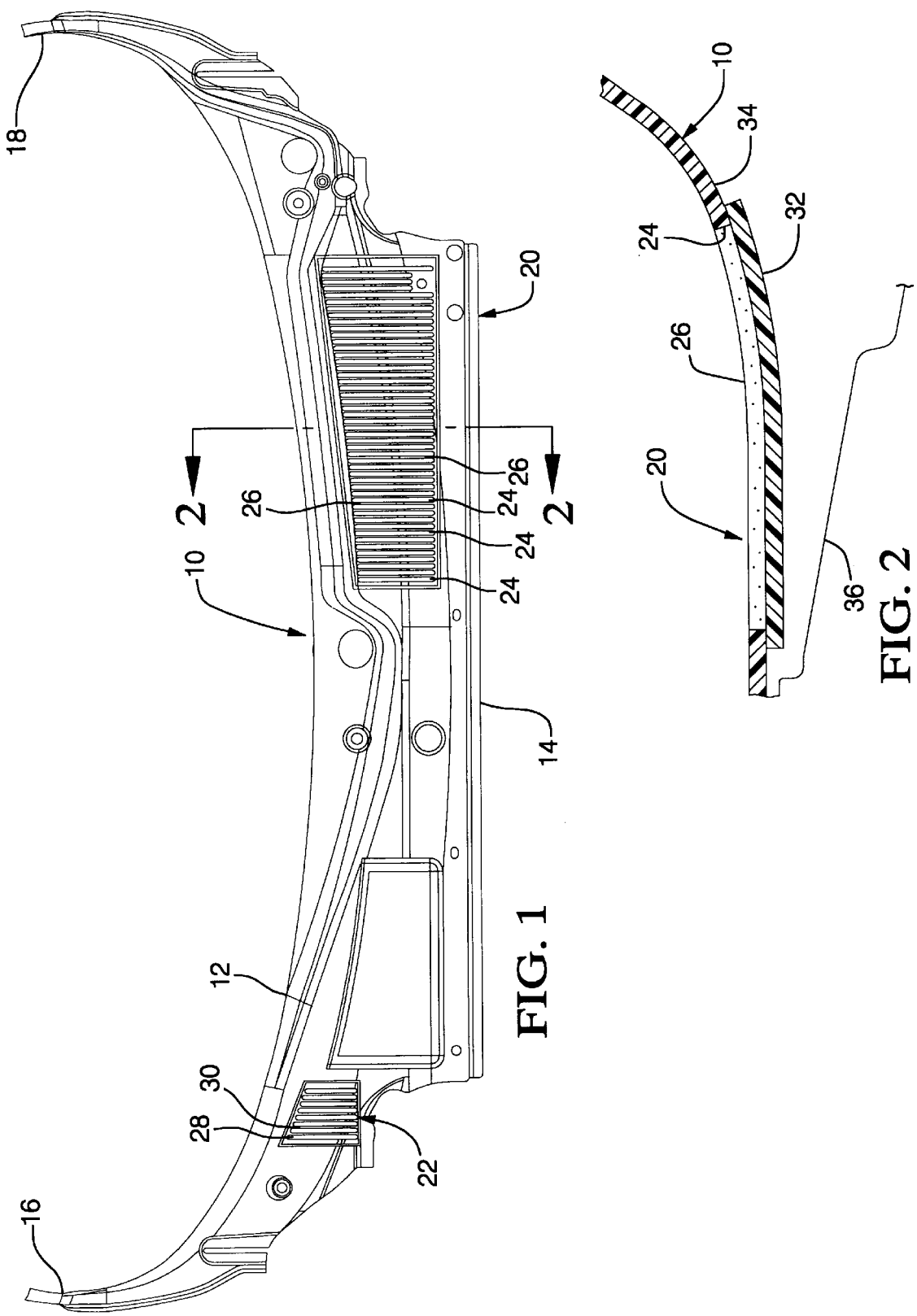

COWL PANEL WITH WATER RESISTANT HVAC AIR INLETS

TECHNICAL FIELD

This invention relates to heating, ventilating, air conditioning (HVAC) systems in automobiles and more particularly to the air inlet vents for such systems.

BACKGROUND OF THE INVENTION

Automobile vehicles HVAC systems for treating and conditioning the ambient air inside the vehicle. These systems comprise a heater and an air conditioner. The heater warms the air that is recirculated in the vehicle and the air that is brought into the vehicle from the atmosphere surrounding the vehicle. The air conditioner dries the air that is both in recirculated in the vehicle and introduced from the atmosphere. Most of the currently available passenger vehicles have a continuous ventilation system. That is a portion of the air in the vehicle is discharged or vented from the vehicle and replacement air is introduced into the vehicle.

The vented air is generally expelled through the rear of the vehicle and the replacement air is brought in through the front of the vehicle. The air entering the vehicle passes through a cowl panel and plenum adjacent the outer edge of the front windshield. The cowl panel has a screen that prevent debris from entering the plenum. The plenum has drain passages that collect the liquid, such as rain water, and prevent it from continuing with the incoming air that enters the interior of the vehicle.

SUMMARY OF THE INVENTION

It is an object of the present invention to provide an improved air inlet apparatus that discourages liquid from entering the ventilation system of an automobile.

In one aspect of the present invention, a gas permeable material is assembled adjacent a cowl air inlet opening in a passenger vehicle. In another aspect of the present invention, the gas permeable material has liquid rejecting properties. In yet another aspect of the present invention, a spunbonded plastic material is heat bonded to the underside of the cowl immediately beneath the air vents. In still another aspect of the present invention, the spunbonded plastic material has various sizes of pores the larger of which will permit water to drip through at a very slow rate.

BRIEF DESCRIPTION OF THE DRAWINGS

FIG. 1 is a top view of a cowl panel for a vehicle;

FIG. 2 is a view taken along line 2—2 in FIG. 1.

"The mat structure 32 may be secured by heat bonding, adhesive bonding or by other conventional fastening method".

DESCRIPTION OF AN EXEMPLARY EMBODIMENT

Referring to the drawings wherein like characters represent the same or corresponding parts there is seen a cowl 10 for an automobile, not shown. The cowl 10 is generally a molded plastic component but can also be manufactured as a stamped metal part. The cowl 10 has a windshield side 12 and front of vehicle side 14. The ends 16 and 18 of the cowl 10 are curved to accommodate the vehicle design. A pair of air vents 20 and 22 are formed in the cowl 10.

The vent 20 has a plurality of slots 24 and bars 26. The vent 22 has a plurality of slots 28 and bars 30. The vent 20 has a larger surface area than the vent 22, however this does not affect the function of the vents 20 and 22. The vents are of sufficient total area to permit the required air flow to pass through the slots 24 and 28.

A gas permeable mat structure 32 is secured to an undersurface 34 of the cowl 10 at a location to cover the vent 20 as seen in FIG. 2. By way of example, the mat 32 is a spunbonded polymer such as a spunbonded polyester or a spunbonded polypropylene. An acceptable spunbonded polyester is commercially available under the registered trademark REEMAY® and an acceptable spunbonded polypropylene is commercially available under the registered trademark TYPAR®. The REEMAY® product tested has an ASTM D 737 air permeability of 525 cfm, an efficiency in air of 65% and an efficiency in water of 40%. The TYPAR® product tested has a Fraizier Air Permeability of 2.03 m$^3$/m$^2$/sec, an efficiency in air of 43% and an efficiency in water of 20%.

Neither of the spunbonded materials tested are completely water impermeable. Therefore, a small amount of liquid will pass through the spunbonded material. Any liquid that penetrates the mat 32 will drip into a plenum 36 that is secured in the vehicle immediately below the cowl 10. The plenum is a conventional sheet metal component presently assembled in automotive vehicles. The plenum 36 has drain openings, not shown, which permit the liquid to drain back to the environment. With the present invention, the amount of liquid entering the plenum is significantly reduced when compared with currently available HVAC systems. This provides less humid air entering the vehicles environment which make the proper conditioning of the air more efficient.

What is claimed is:

1. A cowl assembly for an automotive vehicle comprising:
   a cowl panel extending horizontal on the vehicle so that liquid rain water falls upon the cowl panel,
   an air vent formed in said cowl panel having a plurality of air passages for permitting air flow through said cowl to be distributed to the interior of the automotive vehicle; and
   an air permeable spunbonded polymeric mat heat bonded to an underside of said cowl covering said air vent said mat having pores therein sized to permit the flow of air therethrough and yet restrict the flow of liquid through the air vent.

2. A cowl assembly for an automotive vehicle comprising:
   a cowl panel extending horizontal on the vehicle so that liquid rain water falls upon the cowl panel,
   an air vent formed in said cowl panel having a plurality of air passages for permitting air flow through said cowl to be distributed to the interior of the automotive vehicle; and
   an air permeable spunbonded polymeric mat heat bonded to an underside of said cowl covering said air vent said mat having pores therein sized to permit the flow of air therethrough and yet restrict the flow of liquid through the air vent, and said mat being a spunbonded polyester having an ASTM D 737 air permeability of about 525 CFM and an efficiency in air of about 65% and an efficiency in water of about 40%.

3. A cowl assembly for an automotive vehicle comprising:

a cowl panel extending horizontal on the vehicle so that liquid rain water falls upon the cowl panel, an air vent formed in said cowl panel having a plurality of air passages for permitting air flow through said cowl to be distributed to the interior of the automotive vehicle; and an air permeable spunbonded polymeric mat heat bonded to an underside of said cowl covering said air vent said mat having pores therein sized to permit the flow of air therethrough and yet restrict the flow of liquid through the air vent, and said mat being a spunbonded polypropylene having a fraizier air permeability or 2.03 $m^3/m^2/sec$ and an efficiency in air of about 43% and an efficiency in water of about 20%.

* * * * *